United States Patent [19]

Rader

[11] Patent Number: 5,076,752
[45] Date of Patent: Dec. 31, 1991

[54] MULTI-PURPOSE FARM IMPLEMENT

[76] Inventor: DuWayne Rader, Rt. 1, Box 185, Menahga, Minn. 56464

[21] Appl. No.: 493,934

[22] Filed: Mar. 15, 1990

[51] Int. Cl.$^5$ .......................... A01D 90/10; B60P 1/16
[52] U.S. Cl. ........................................ 414/470; 119/60; 298/17.7; 298/18; 414/24.5
[58] Field of Search ..................... 414/24.5, 111, 470; 105/263, 275, 276; 119/60; 298/17.5, 17.6, 18, 17.7

[56] References Cited

U.S. PATENT DOCUMENTS

| | | | |
|---|---|---|---|
| 2,739,836 | 3/1956 | Kilpatrick | 298/17.6 X |
| 3,906,901 | 9/1975 | Cox | 119/58 |
| 3,922,036 | 11/1975 | Kalsbeck | 414/470 X |
| 3,972,308 | 8/1976 | Ray | 119/60 |
| 4,067,298 | 1/1978 | Jones et al. | 119/60 |
| 4,092,050 | 5/1978 | Sobeck | 298/18 |
| 4,106,812 | 8/1978 | Clark | 298/1 B |
| 4,119,222 | 10/1978 | Kaarnametsa | . |
| 4,138,159 | 2/1979 | Hall | 298/18 |
| 4,258,663 | 3/1981 | Schoessow | 119/58 |
| 4,261,676 | 4/1981 | Balling, Sr. | 414/24.5 |
| 4,453,761 | 6/1984 | Felburn | 296/43 |
| 4,500,242 | 2/1985 | Beikman | 414/24.5 |
| 4,580,843 | 4/1986 | Lund | 298/18 |
| 4,930,958 | 6/1990 | Palmer | 414/24.5 |

Primary Examiner—Robert J. Spar
Assistant Examiner—Janice Krizek
Attorney, Agent, or Firm—Merchant, Gould, Smith, Edell, Welter & Schmidt

[57] ABSTRACT

This invention provides a farm implement that is transformable between three different configurations in order to perform three different tasks. In a first configuration, the invention is suitable for hauling goods. By rotating its side members about their outer edges, the invention may be transformed into a second configuration, which is suitable for unloading goods. By rotating its side members about their inner edges, the invention may be transformed into a third configuration, which is suitable for presenting goods to livestock.

11 Claims, 3 Drawing Sheets

MULTI-PURPOSE FARM IMPLEMENT

BACKGROUND OF THE INVENTION

1. Field of the Invention

This invention relates generally to farm equipment, and more specifically, to a multi-purpose farm implement, wherein goods may be selectively transported, unloaded, and presented to livestock.

2. Description of the Art

Generally, modern day farming requires an assortment of expensive equipment for performing a variety of tasks. As a result, it is desirable to maximize the use of such equipment, so as to minimize the need for additional equipment. Maximum use is a function of capacity, as well as versatility.

The gathering and storage of hay usually requires a tractor and at least three additional pieces of equipment, namely, a baler, a wagon, and a loader. After the hay is baled, a loader is used to load the bales of hay onto a wagon. The wagon is then taken by tractor to a storage facility, where the hay is to be unloaded. In order to unload the hay, the farmer must either make a second trip to and from the field to bring the loader to the storage facility, or he must have a second loader stationed at the storage facility. Thus, it is desirable to have a wagon capable of unloading the bales of hay, so that the farmer need not expend additional time or money, either shuttling the single loader back and forth or purchasing a second loader, respectively.

As a result of having to make separate trips to and from the field in order to move the hay and the loader, some farmers load more than one wagon at a time and pull them in series to the storage facility. Not only does such practice require additional wagons, but in some areas it is illegal. If the farmer needed to make only one trip per load between the field and the storage facility, then he would be less likely to pull multiple wagons in series. Also, if the wagon for hauling the bales had a greater capacity, then the farmer would be even less likely to pull multiple wagons. Thus, it is desirable that a wagon have a sufficiently large capacity as to minimize the number of wagons required, as well as the number of trips to and from the field.

When the time comes for feeding the hay to the livestock, the farmer generally loads the bale(s) on a wagon and takes the bale(s) to a feeder or feeders for presentation to the livestock. A bale of hay is then unloaded into the feeder for consumption by the livestock. With many feeders, the bale of hay is dropped on the ground within the feeder, and thus, capable of damaging the feeder, as well as being susceptible to spoilage. Thus, it is desirable to have a feeder that is transportable, so that the bale(s) of hay may be placed within the feeder by a loader at the storage facility. Although a loader could be taken along with the wagon to the feeder, two trips would be required, with resulting inefficiency. Also, it is desirable that the feeder hold the hay off the ground to minimize waste and spoilage.

Another problem with feeders is that they may only be suitable for one size bale of hay. As a result, if the farmer ever switches to a different type of baler, then he would also have to acquire a compatible feeder. Thus, it is desirable that a feeder be suitable for any size bale. Additionally, it is desirable that a feeder have a sufficiently large capacity as to minimize the number of feeders and/or trips to the feeders.

Finally, it is desirable to have a single piece of equipment that can be used as a wagon, an unloader, and a feeder, and that has all of the desired attributes for each piece of equipment. The present invention provides such a multi-purpose farm implement, performing at least three functions, each of which typically requires a separate piece of equipment. First, it provides a wagon for transporting a load of goods. Second, it provides means for unloading the goods being transported, which, in the case of bales of hay, can then be stacked with a loader at a more convenient time. Third, it provides structure for presenting goods to livestock. Thus, the present invention represents a contribution to the art of farming equipment, in that it helps maximize the use of equipment, thereby minimizing the amount of equipment required and resources expended in performing a given task.

SUMMARY OF THE INVENTION

The present invention provides a farm implement, wherein goods are selectively transported, unloaded, and presented to livestock, comprising: (a) means for retaining the goods; and (b) means, operatively connected to said retaining means, for selectively transforming said retaining means among a plurality of positions, wherein a first position is suitable for transporting the goods, and a second position is suitable for unloading the goods, and a third position is suitable for presenting the goods to livestock.

According to another embodiment of the invention, there is provided a farm implement, wherein goods are selectively transported, unloaded, and presented to livestock, comprising: (a) a frame; (b) a first side member, operatively connected to said frame, having an inner edge and an outer edge; (c) a second side member operatively connected to said frame, having an inner edge and an outer edge; (d) a floor member, connected to said frame and positioned between said side members; and (e) means, operatively connected to said side members, for selectively rotating at least one of said side members relative to said frame, wherein a first configuration is suitable for transporting the goods, and a second configuration is suitable for unloading the goods, and a third configuration is suitable for presenting the goods to livestock.

While the invention will be described with respect to a preferred embodiment designed specifically for transporting, unloading, and presenting round bales of hay to livestock, it will be understood that the invention is not limited to such preferred embodiment, but may used in connection with various other goods. Furthermore, variations of the invention will become apparent to those skilled in the art upon a more detailed description of the invention.

BRIEF DESCRIPTION OF THE DRAWINGS

Referring to the Figures, wherein like numerals represent like parts throughout the several views.

DETAILED DESCRIPTION OF THE INVENTION

Figure 1:
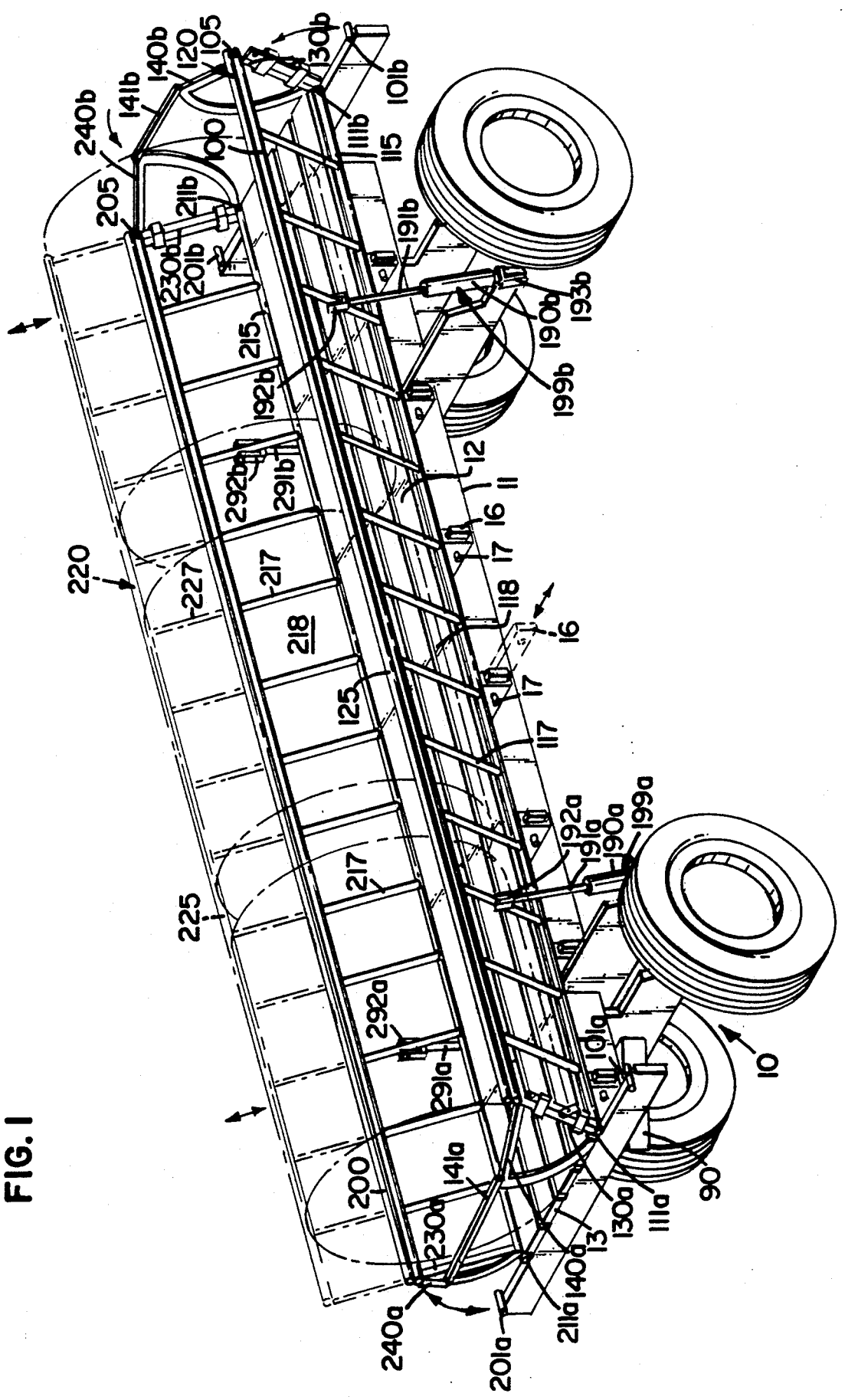
FIG. 1 is a perspective view of a preferred embodiment of the multi-purpose farm implement that is configured for presentation of the bales of hay to livestock.

Referring to FIG. 1, a preferred embodiment of a multi-purpose farm implement incorporating the principles of the present invention is generally designated at 10. The farm implement generally includes a frame 11, a first side member 100, a second side member 200, and a floor member 12. The floor member 12 includes a series of planks 13 that extend the length of the farm implement and are secured to the frame 11.

The side members 100 and 200 are connected to the frame 11 by hydraulic members 199a and 199b and 299a and 299b, respectively, and by inner pins 111a and 111b and 211a and 211b, respectively, and by outer pins 101a and 101b and 201a and 201b, respectively. The connections between the side members 100 and 200 and the frame 11 are such that the side members may be selectively rotated about the inner pins or the outer pins. With reference to hydraulic member 199b, each hydraulic member includes a base member 190b (or its counterpart) and a rod 191b (or its counterpart), which slides relative to the base member. The base member is connected to the frame by a bracket 193b (or its counterpart), and the rod is connected to the side member by a bracket 192b (or its counterpart). Activation of the hydraulic member causes rod 191b (or its counterpart) to extend or retract, resulting in rotation of at least one side member about the pins to which it is currently anchored, as explained in greater detail below. As a result, the farm implement may be transformed between three different configurations, each of which is suitable for performing a different task.

Figure 2:
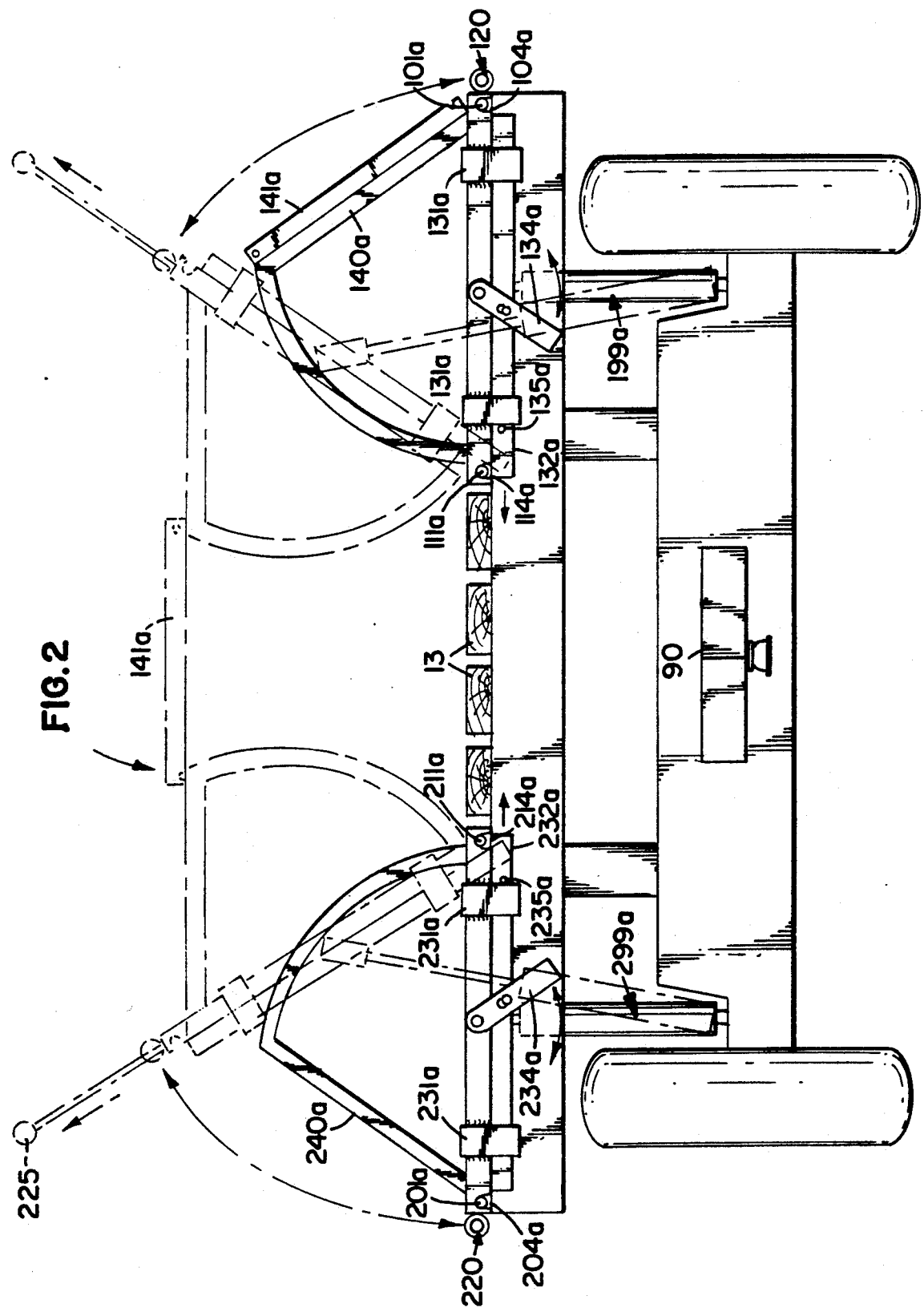
FIG. 2 is a front end view of the preferred embodiment shown in FIG. 1 that is configured for transportation of the bales of hay.
Figure 3:
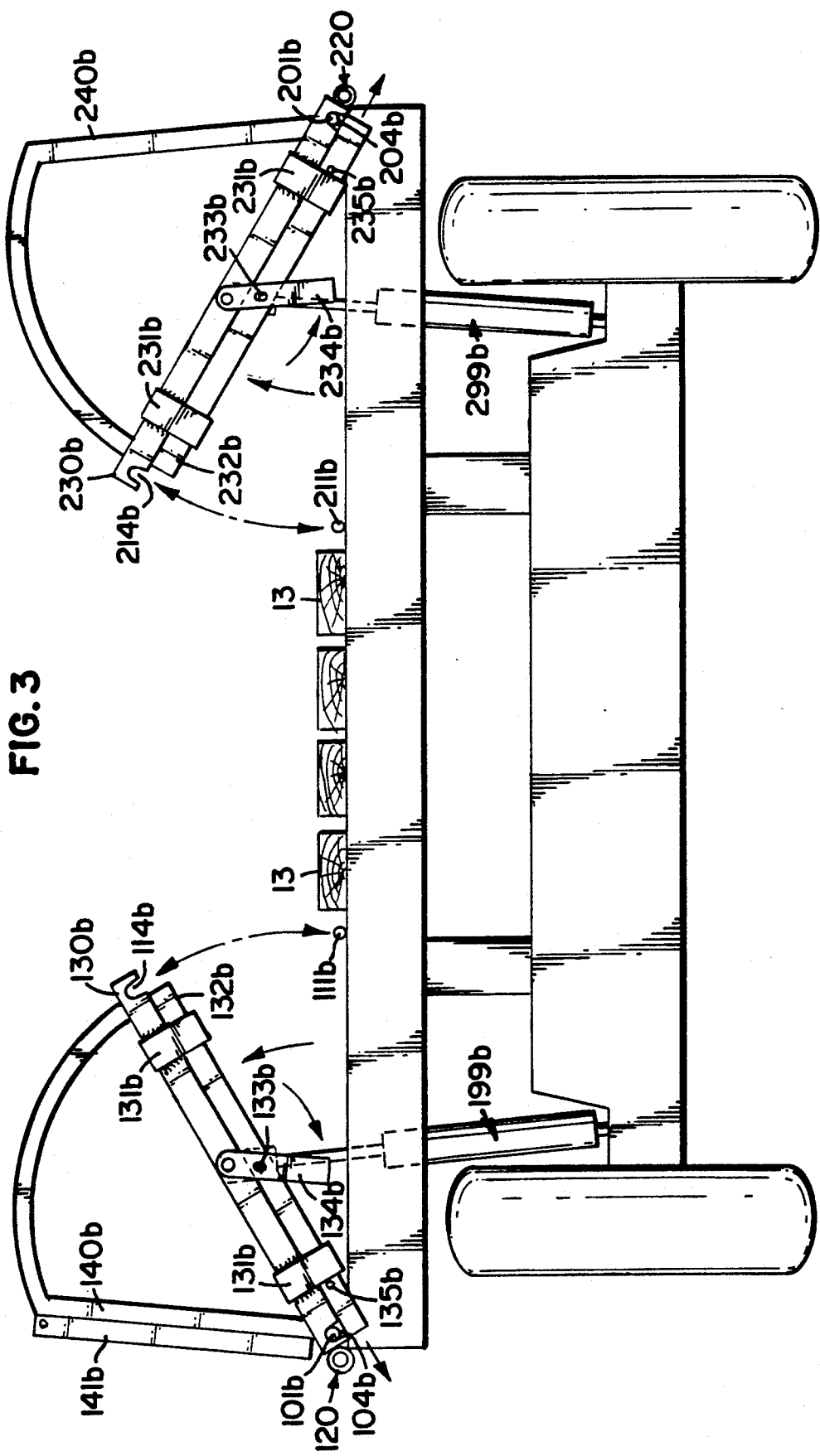
FIG. 3 is a back end view of the preferred embodiment shown in FIGS. 1 and 2 that is configured for unloading the bales of hay.

In a first configuration, as shown by solid lines in FIG. 2, the farm implement is suitable for transporting goods. In a second configuration, as shown in FIG. 3, the farm implement is suitable for unloading goods. Finally, in a third configuration, as shown in FIG. 1 and by phantom lines in FIG. 2, the farm implement is suitable for presenting goods, and in particular, round bales of hay, to livestock.

Referring to FIG. 1, the side members 100 and 200 include inner rods 115 and 215 and outer rods 105 and 205, respectively, all of which extend the length of the farm implement and substantially define the inner edges and outer edges of the side members, respectively. The inner and outer rods of the side members 100 and 200 are joined at their ends by end members 130a and 130b and 230a and 230b, respectively, and at intervals therebetween by bars 117 and 217, respectively. Certain of these bars provide the basis for connection of the rods 191a and 191b to the side members. The bars define gaps 118 and 218 that allow livestock to access the goods presented by the farm implement.

End brackets 140a and 140b and 240a and 240b are attached to the end members of side members 130a, 130b and 230a, 230b respectively. The end brackets extend away from the plane defined by the opposing end members in order to avoid interference between the end brackets and the round bales of hay. Connecting bars 141a and 141b are pivotally attached to end brackets 140a and 140b, respectively. The connecting bars 141a and 141b may be moved to bridge the span between the opposing end brackets and may be releasably joined to the end brackets 240a and 240b, respectively. With the connecting bars joining the ends of the opposing side members, the hydraulic members may be released or even removed altogether, if so desired, as may be the case if the implement is expected to remain in a single configuration for an extended period of time.

Referring to FIG. 3, braces 131b and 231b are secured to end members 130b and 230b, respectively. Engagement members 132b and 232b slide within the braces 131b and 231b, respectively. Handles 134b and 234b are rotatably mounted to end members 130b and 230b, respectively, and slidably engage pins 133b and 233b fastened to engagement members 132b and 232b, respectively. The handles facilitate the sliding of the engagement members relative to the end members.

The end members have inner notches 114b and 214b and outer notches 104b and 204b, which are configured to partially enclose inner pins 111b and 211b and outer pins 101b and 201b, respectively. When the engagement members are slid toward the outer edges of the side members, the engagement members enclose the outer pins within the outer notches, thereby anchoring the outer edges of the side members to the frame. At the same time, the engagement members are clear of the inner notches and inner pins, so that the inner edges of the side members are not secured to the frame. Thus, the side members are free to rotate about the outer pins and, in fact, do so in response to an upward force applied by the rods 191 of the hydraulic members 190. With the engagement members in this position, the farm implement may be transformed between configurations suitable for transporting goods and for unloading goods.

With the ability to unload the goods from the implement as provided, a farmer who is gathering and storing bales of hay requires only a single loader, which he can leave out in the field. The bales can be taken to a storage facility and dumped, and the farmer can use his loader to store them in an orderly manner at a more convenient time. Note that the farmer can selectively dump bales from either side of the implement by activating the hydraulic members for that side only.

Referring to FIG. 2, the engagement members 132a and 232a are slid toward the inner edges of the side members, enclosing the inner pins 111a and 211a within the inner notches 114a and 214a, thereby anchoring the inner edges of the side members to the frame. The outer pins 101a and 201a are released, and the outer edges of the side members are free to rotate in response to an upward force applied by the rods 191 of the hydraulic members 190. With the engagement members in this position, the farm implement may be transformed between configurations suitable for transporting goods (solid lines) and for presenting the goods to livestock (phantom lines).

As a feeder, the implement may be taken to the storage facility and loaded directly with a loader. The implement holds the hay off the ground, and the particular structure is suitable for bales of all sizes and shapes. The remaining hay simply gravitates toward the floor member as the lower hay is removed.

The engagement members may be locked in either position by pin members 135a and 235a (and 135b and 235b, shown in FIG. 3). Also, note that the side members may be rotated to a lesser degree about the inner edges to stabilize a load of goods during transportation.

Note that it is not necessary that both side members be selectively rotatable in order for the invention to achieve the desired results. For example, the invention could have a rotating member, similar to the side members of the preferred embodiment, and an opposing member, which provides the necessary counterpart for the feeder configuration.

As seen in FIG. 1, a series of cross-members 16 (and others which are not shown) are slidably connected to the frame 11. The cross-members may be moved back and forth between extended and retracted positions to provide support for goods being transported and to provide access to goods being presented to livestock, respectively. The cross-members may be locked in a given position by pin members 17 (and others which are not shown). Such cross-members may additionally include consecutively nested members that can be further extended to provide support for transportation of additional goods, so that any limit on capacity is merely a function of weight limits on the tires or tractor. Thus, the implement reduces the need for several wagons to haul bales of hay.

Also shown in FIG. 1 are extension members 120 and 220, with extension member 220 shown in its extended position in phantom lines. The extension members may be moved to an extended position to provide support for presenting additional goods, and in particular, larger round bales of hay, to livestock. The extension members include exterior rods 125 and 225 and nesting bar members 227 (and others which are not shown). The nesting bar members slide within hollows in bars 117 and 217 of side members 100 and 200, respectively. The extension members may be locked in an extended position by some type of simple pin connection (not shown). Again, the net effect is to substantially enhance capacity, subject only to any weight constraints of the tires or tractor. The enhanced capacity reduces the need for several feeders, as well as the number of trips to and from the feeder(s).

Still referring to FIG. 1, a hitch 90 is attached to the front of the farm implement to facilitate connection to transportation means, and in particular, a tractor. Additionally, the farm implement may be fitted with conventional suspension, axles, wheels, etc ..., or it may be secured to a wide variety of known wagons.

While a specific embodiment of the invention has been disclosed, it is to be understood that such disclosure has been merely for the purpose of illustration and that the invention is not to be limited in any manner thereby. Various modifications of this invention will be apparent to those skilled in the art in view of the foregoing example. The scope of the invention is to be limited only by the appended claims.

What is claimed is:

1. A farm implement with which goods are selectively transported, unloaded, and presented to livestock, comprising:
   (a) means for retaining the goods wherein said retaining means includes a first rotating member and a second rotating member; and
   (b) means, operatively connected to said retaining means, for selectively transforming said retaining means among a plurality of configurations, including a first configuration that is suitable for transporting the goods, a second configuration that is suitable for unloading the goods, and a third configuration that is suitable for presenting the goods to livestock, and said transforming means includes means for selectively rotating said first rotating member between a first position corresponding to said first configuration and a second position corresponding to said second configuration, and for selectively rotating said first rotating member between said first position and a third position corresponding to said third configuration, and said transforming means includes means for selectively rotating said second rotating member about a first axis between a first position corresponding to said first configuration and a second position corresponding to said second configuration, and for selectively rotating said second rotating member about a second axis between said first position and a third position corresponding to said third configuration.

2. A farm implement according to claim 1, wherein when in said second position, said rotating member faces at least partially away from said opposing member, and when in said third position, said rotating member faces at least partially toward said opposing member.

3. A farm implement according to claim 2, further comprising means, operatively connected to said retaining means, for facilitating transportation of the implement.

4. A farm implement with which goods are selectively transported, unloaded, and presented to livestock, comprising:
   (a) a frame;
   (b) a first side member, operatively connected to said frame, having an inner edge and an outer edge;
   (c) a second side member, operatively connected to said frame, having an inner edge and an outer edge;
   (d) a floor member, connected to said frame and positioned between said side members; and
   (e) means, operatively connected to said side members, for selectively rotating at least one of said side members relative to said frame, wherein when said at least one of said side members occupies a first position it is in a configuration that is suitable for transporting the goods, and when said at least one of said side members occupies a second position it is in a configuration that is suitable for unloading the goods, and when said at least one of said side members occupies a third position it is in a configuration that is suitable for presenting the goods to livestock, and said at least one of said side members rotates substantially about said outer edge to move between said first position and said second position, and said at least one of said side members rotates substantially about said inner edge to move between said first position and said third position.

5. A farm implement according to claim 4, wherein said rotating means includes inner pins and outer pins, connected to said frame, and engagement members, operatively connected to at least one of said side members, wherein when said engagement members engage said inner pins, at least one of said side members is free to rotate substantially about said inner edge, and when said engagement members engage said outer pins, at least one of said side members is free to rotate substantially about said outer edge.

6. A farm implement according to claim 5, wherein said rotating means includes means for selectively engaging said inner pins and said outer pins.

7. A farm implement according to claim 6, wherein at least one of said side members has bars defining gaps therebetween, whereby the livestock may access the goods through said gaps.

8. A farm implement according to claim 7, wherein said rotating means includes hydraulic members, operatively connected to said frame and at least one of said side members.

9. A farm implement according to claim 8, further comprising cross-members, operatively connected to said frame, wherein said cross-members are extendable beyond said outer edge of at least one of said side members, whereby said cross-members provide added capacity for transportation of the goods, and wherein said cross-members are retractable to a position adjacent at least one of said inner edges of said side members, wherein said cross-members do not interfere with presentation of the goods to the livestock.

10. A farm implement according to claim 9, wherein at least one of said side members includes extension members, wherein said extension members extend beyond said outer edge of at least one of said side members, and whereby said extension members provide added capacity for presentation of the goods to livestock.

11. A farm implement according to claim 10, further comprising means for locking at least one of said side members in said third configuration.

* * * * *